March 9, 1948.   C. F. COAKE   2,437,661
OSCILLATOR CONTROLLED FOLLOW-UP SYSTEM
Filed Feb. 24, 1945
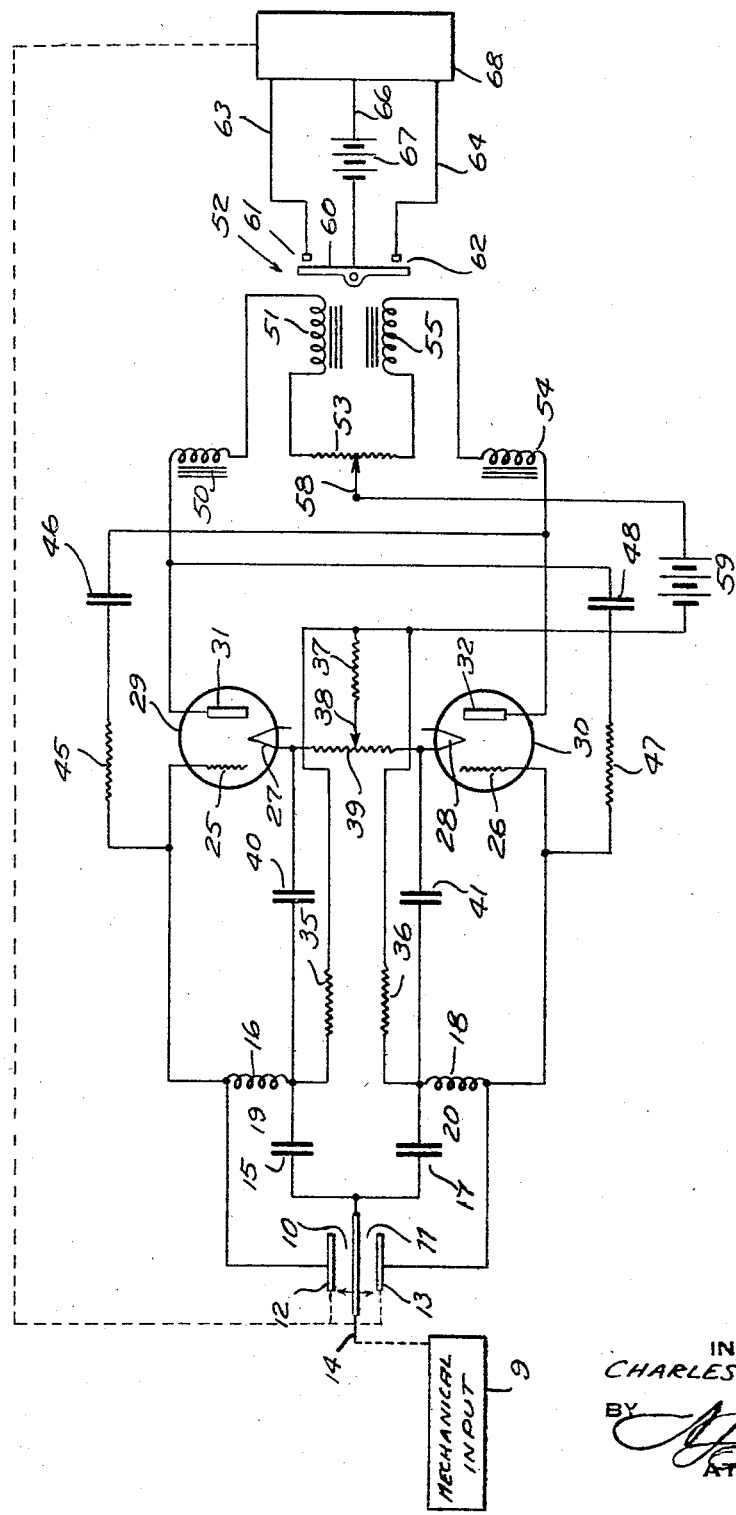
INVENTOR
CHARLES F. COAKE
BY
ATTORNEY Patented Mar. 9, 1948

2,437,661

UNITED STATES PATENT OFFICE 2,437,661

OSCILLATOR CONTROLLED FOLLOW-UP SYSTEM

Charles F. Coake, Indianapolis, Ind., assignor to Senn Corporation, New Augusta, Ind., a corporation of Indiana Application February 24, 1945, Serial No. 579,628

7 Claims. (Cl. 318—31)

This invention relates to a sensitive response system which requires only a negligible input force and has for an object to provide a system of the above type which operates with extreme sensitivity and accuracy. The invention may be applied to a measuring system for determining whether the variations in a quantity being measured exceed a predetermined limit of tolerance, or to a control or a follow-up system.

In one embodiment of the invention the input element comprises a variable impedance device such as a condenser having a pair of stationary plates and an intermediate movable plate which is actuated to vary the capacities between the movable plate and the respective fixed plates in an opposite sense. The movable plate may be controlled by the quantity being measured or may constitute the input element of a sensitive control or follow-up system. The movable plate may, for example, be actuated by movement of a gyroscope, earth inductor compass or other directional element of a control system. In the case of a follow-up system the fixed plates may be actuated by the follow-up drive so as to restore the relative position thereof with respect to the movable plate.

In the embodiment shown, the variable impedance devices are connected as parts of tuned circuits which control a pair of space discharge devices operating as a push-pull oscillator. The connections are such that when the movable plate is in a predetermined position the oscillator tubes are in balanced condition and equal grid currents and plate currents are drawn thereby. However, when the movable plate is shifted from such position the operation of the tubes becomes unbalanced and the grid and plate currents drawn by the respective tubes vary in an opposite sense.

The plate currents of the tubes may be utilized for actuating a differential relay which is in a balanced position when the plate currents are equal but is actuated in response to the differential effect of the plate currents when they become unequal. The relay may control a pair of control circuits in accordance with the differential effect of the plate currents drawn by the two oscillator tubes. The control circuits may be used for any desired purpose, such as for the actuation of signals, to control the steering motor of a ship or to drive a follow-up mechanism. Inasmuch as such mechanisms are well-known and form no part of the present invention they are not shown herein in detail. One such mechanism involving a gyro controlled follow-up is shown, for example, in the U. S. Patent 1,784,504, dated December 9, 1930, for Variable-speed control device.

Although the novel features which are believed to be characteristic of this invention are pointed out more particularly in the claims appended hereto, the invention itself may be better understood by referring to the following description taken in connection with the accompanying drawings in which a specific embodiment thereof has been set forth for purposes of illustration.

In the drawing, the figure is a schematic diagram of a control circuit embodying the present invention.

Referring to the drawing, the variable impedance device is shown as comprising a pair of condensers 10 and 11 having fixed plates 12 and 13 respectively and a common movable plate 14 which is disposed therebetween in a manner to be shifted toward or away from the respective plates 12 and 13 for varying the capacities of condensers 10 and 11 in an opposite sense. The movable plate 14 is normally set in a predetermined position which may or may not be its mid-position and is adapted to be actuated by a mechanical input member indicated by rectangle 9 in response to a quantity to be measured so that the deflection of the plate 14 corresponds to variations in said quantity. When used on a control or follow-up mechanism responsive, for example, to an earth inductor compass or a gyroscope the plate 14 is connected to be actuated by movement of the latter elements.

In the embodiment shown the condensers 10 and 11 are connected respectively in series with condenser 15 and inductance 16 and with condenser 17 and inductance 18 to form a pair of resonant circuits 19 and 20. Obviously additional condensers can be placed across any portion of the resonant circuits to give proper LC ratios for reliable operation.

The resonant circuits 19 and 20 are connected respectively. The grid returns to the cathodes 27 and 28 include series resistors 35 and 36 respectively and a common resistor 37 which is connected in series therewith to the variable tap 38 of a potentiometer 39 the ends of which are connected to the cathodes 27 and 28. The resistors 35, 36 and 37 are by-passed to the cathodes 27 and 28 by condensers 40 and 41 respectively.

The grids and plates of the tubes 29 and 30 are cross-connected by a feedback network comprising a resistance 45 and condenser 46 connected in series between the grid 25 and the plate 32, and a resistance 47 and a condenser 48 connected in series between the grid 26 and the plate 31.

The plate circuit of the tube 29 includes a choke 50 and a coil 51 of a differential relay 52 connected in series to one side of a potentiometer 53. The plate circuit of the tube 30 includes a choke 54 and a second coil 55 of the relay 52 connected in series with the other side of potentiometer 53. The tap 58 of the potentiometer 53 is connected to a suitable source 59 of plate potential, the negative side of which is connected to the junction between the resistance 37 and the resistances 35 and 36.

The relay 52 is provided with an armature 60 which is adapted to selectively close contacts 61 and 62 in response to differential energization of the coils 51 and 55. The contacts 61 and 62 close control circuits including lines 63 and 64 respectively and a common return line 66 having a source of potential 67 connected thereto. The lines 63, 64 and 66 are to be connected to any desired control or follow-up apparatus indicated generally by rectangle 68, such as the follow-up mechanism described in the above mentioned U. S. Patent No. 1,784,504.

It is to be understood that the space discharge devices 29 and 30 may include control elements and heaters not shown and that only so much of the circuit has been disclosed as is necessary to an understanding of the present invention. Suitable amplifiers may be interposed between the push-pull oscillator and the relay 52 if desired.

In the operation of this device the adjustments are such that the tubes 29 and 30 oscillate in a push-pull manner at a frequency determined by the constants of the tuned circuits 19 and 20 and are locked in step by the feed-back network including the resistors 45 and 47 and condensers 46 and 48 and by the coupling of the condensers 10 and 11. The potentiometer 39 may be adjusted to compensate for variations in the tuned circuits and in the tubes 29 and 30 so as to cause the tubes 29 and 30 to operate in a balanced manner when the variable plate 14 of the condensers 10 and 11 is set in a predetermined position which may or may not be its mid-position. The resistors 45 and 47 are selected to stabilize the operation of the tubes.

Under these conditions, the tubes 29 and 30 draw equal grid currents and equal grid bias voltages are produced by the grid currents flowing through the resistors 35 and 36. Likewise, equal space currents are drawn and equal currents will flow through the relay coils 51 and 55. The potentiometer 53 may be adjusted to compensate for any variations in the coils 51 and 55 and in their associated circuits so that under the above conditions the operation is balanced and both contacts 61 and 62 remain open.

If now the plate 14 is moved either toward the plate 12 or toward the plate 13 in response to a variation in the input quantity, the capacity of one of the condensers 10, 11 is increased and that of the other decreased, thereby changing the tuning of the tuned circuits 19 and 20 and unbalancing the operation of the push-pull oscillator tubes in a manner such that one of the tubes draws more grid current than the other and causes a corresponding change in the grid bias produced by the resistors 35 and 36. This causes a corresponding change in the space currents drawn by the two tubes and causes different currents to flow in the relay coils 51 and 55 so that a differential effect is produced corresponding to the movement of the plate 14. The adjustment is such that when this differential effect reaches a predetermined value one or the other of the contacts 61, 62 is closed, depending upon the sign of the differential effect which, in turn, is dependent upon the direction of movement of the plate 14 from its original position. Closing of the respective contacts 61 and 62 completes the corresponding control circuit to actuate the control elements not shown.

If the displacement of the plate 14 is due to a change in dimension of an item being measured, the control circuit may close visual signals to indicate that the dimension varies by a predetermined amount from its standard value. The system thus comprises a limit indicating system. If, on the other hand, the plate 14 is actuated by a directional device such as an earth conductor compass or a gyroscope located on a vessel, the output circuit controlled by the contacts 61, 62 may actuate a steering motor to maintain the vessel on a predetermined course. In the case of a follow-up device, the control circuit may control the mounting for the plates 12 and 13 in a manner to restore the balance between the condensers 10, 11.

It will be noted that the above described system is extremely sensitive and may be adjusted to control the output circuits in response to micromovements of the plate 14. It will also be evident that this movement of the plate 14 produces a negligible reaction on the input element. This feature is of particular importance in gyro-controlled mechanism where reaction of the controlled element would tend to produce precessing forces which would influence the operation of the gyroscope.

Although certain specific embodiments of the invention have been described above, it is to be understood that the invention is capable of various uses and adaptations as will be readily apparent to a person skilled in the art. The invention is only to be limited in accordance with the scope of the following claims.

What is claimed is:

1. A control system comprising a variable impedance device having a pair of impedance elements, movable means responsive to a control element to vary the impedances of said elements in opposite sense, a pair of tuned circuits including the respective impedance elements, a pair of spaced discharge tubes connected for operation as a push-pull oscillator, said tubes having input circuits including said tuned circuits and connected for balanced operation when said movable means is in a predetermined position, differential relay means including sets of contacts to be selectively actuated, and means connecting said relay means to be actuated in response to the differential effect of the space currents in said tubes produced by a predetermined displacement of the movable means.

2. A control system comprising a pair of variable condensers formed by a pair of relatively fixed plates and an intermediate movable plate which is adapted to vary the capacities of said condensers in opposite sense in response to variations in a control element, a pair of space discharge devices having individual tuned input circuits including said condensers and having cross-connected feed-back circuits to cause said devices to oscillate in unison as a push-pull oscillator and to draw substantially equal space currents when said condensers have predetermined capacities, and response means responsive to the unbalance in operation of said tubes due to predetermined displacements of said movable plate.

3. A control system comprising a pair of variable condensers formed by a pair of relatively fixed plates and an intermediate movable plate which is adapted to vary the capacities of said condensers in opposite sense in response to variations in a control element, a pair of space discharge devices having individual tuned input circuits including said condensers and having cross-connected feed-back circuits to cause said devices to oscillate in unison as a push-pull oscillator and to draw substantially equal space currents when said condensers have predetermined capacities, and means responsive to the differential effect of said space currents due to predetermined displacements of said movable plate.

4. A control system comprising a pair of variable condensers formed by a pair of relatively fixed plates and an intermediate movable plate which is adapted to vary the capacities of said condensers in opposite sense in response to variations in a control element, a pair of space discharge devices having individual tuned input circuits including said condensers and having cross-connected feed-back circuits to cause said devices to oscillate in unison as a push-pull oscillator and to draw substantially equal space currents when said condensers have predetermined capacities, and control circuits responsive to the differential effect of said space currents due to predetermined displacements of said movable plate.

5. A control system comprising a pair of variable condensers formed by a pair of relatively fixed plates and an intermediate movable plate which is adapted to vary the capacities of said condensers in opposite sense in response to variations in a control element, a pair of space discharge devices having individual tuned input circuits including said condensers and having cross-connected feed-back circuits to cause said devices to oscillate in unison as a push-pull oscillator and to draw substantially equal space currents when said condensers have predetermined capacities, differential relay means including sets of contacts to be selectively actuated, and means responsive to the differential effect of said space currents to actuate said relay means in response to predetermined variations in the capacities of said condensers.

6. A control system comprising a pair of variable condensers formed by a pair of relatively fixed plates and an intermediate movable plate which is adapted to vary the capacities of said condensers in opposite sense in response to variations in a control element, a pair of space discharge devices having individual tuned input circuits including said condensers and having cross-connected feed-back circuits to cause said devices to oscillate in unison as a push-pull oscillator and to draw substantially equal space currents when said condensers have predetermined capacities, differential relay means including sets of contacts to be selectively actuated, and means responsive to the differential effect of said space currents to actuate said relay means in response to predetermined variations in the capacities of said condensers, and control circuits selectively energized by closing of said contacts.

7. A control system comprising a pair of variable condensers formed by a pair of relatively fixed plates and an intermediate movable plate which is adapted to vary the capacities of said condensers in opposite sense in response to variations in a control element, a pair of space discharge devices having individual tuned input circuits including said condensers and having cross-connected feed-back circuits to cause said devices to oscillate in unison as a push-pull oscillator and to draw substantially equal space currents when said condensers have predetermined capacities, differential relay means including sets of contacts to be selectively actuated, and means responsive to the differential effect of said space currents to actuate said relay means in response to predetermined variations in the capacities of said condensers and follow-up means selectively energized by closing of said contacts.

CHARLES F. COAKE.

REFERENCES CITED

The following references are of record in the file of this patent:

UNITED STATES PATENTS

| Number | Name | Date |
| --- | --- | --- |
| 1,942,587 | Whitman | Jan. 9, 1934 |
| 2,005,153 | Marks | June 18, 1935 |
| 2,126,910 | Moseley | Aug. 16, 1938 |
| 2,256,875 | Wade | Sept. 23, 1941 |
| 2,333,393 | Ryder | Nov. 2, 1943 |
| 2,395,708 | Alexandersson | Feb. 26, 1946 |